United States Patent [19]

Salvagno et al.

[11] Patent Number: 5,715,696
[45] Date of Patent: Feb. 10, 1998

[54] ARRANGEMENT FOR REDUCING THE HUMIDITY CONTENT OF A GASEOUS MEDIUM

[75] Inventors: Mauro Salvagno, Montegrotto Terme; Mario Polenta, Fiesso d'Artico, both of Italy

[73] Assignee: Hiross International Corporation B.V., Amsterdam

[21] Appl. No.: 591,639

[22] PCT Filed: Jul. 26, 1994

[86] PCT No.: PCT/IB94/00230

§ 371 Date: Mar. 25, 1996

§ 102(e) Date: Mar. 25, 1996

[87] PCT Pub. No.: WO95/03103

PCT Pub. Date: Feb. 2, 1995

[30] Foreign Application Priority Data

Jul. 26, 1993 [AT] Austria ................. A 1488/93

[51] Int. Cl.⁶ .................................................. F25D 21/00
[52] U.S. Cl. ................... 62/272; 62/404; 55/269; 95/189
[58] Field of Search .............................. 62/272, 285, 288, 62/404; 96/188, 189; 95/288, 289; 55/268, 269

[56] References Cited

U.S. PATENT DOCUMENTS

| 3,678,661 | 7/1972 | Davis ............. 55/269 |
| 3,818,718 | 6/1974 | Freese ............. 62/272 |
| 3,861,165 | 1/1975 | Hirano ............. 62/272 |

FOREIGN PATENT DOCUMENTS

| A-2 415 274 | 8/1979 | France . |
| A 2 648 055 | 12/1990 | France . |
| A 22 08 504 | 8/1974 | Germany . |
| A 40 22 802 | 1/1992 | Germany . |
| A 2 085 571 | 4/1982 | United Kingdom . |

*Primary Examiner*—John M. Sollecito
*Attorney, Agent, or Firm*—Henry M. Feiereisen

[57] ABSTRACT

An arrangement for reducing the humidity content of a gaseous medium, in particular air, has a cooling circuit. In order to increase its efficiency, an arrangement of this type is linked to a cooling system (10) known per se and has an evaporator (11) designed as a hollow body (16). The evaporator (11) has a pipe coil (17) through which a coolant, for example freon, can flow and a series of parallel ribs (18), preferably perpendicularly to the pipe coil (17), between which the gaseous medium is led in a first direction as a gas stream. The hollow body (16) is enclosed in an outer housing (12) forming an intermediate space (20) in which the gas stream is led in a second direction opposite to the first.

15 Claims, 2 Drawing Sheets

5,715,696

ARRANGEMENT FOR REDUCING THE HUMIDITY CONTENT OF A GASEOUS MEDIUM

BACKGROUND OF THE INVENTION

The invention refers to an arrangement for reducing the humidity content of a gaseous medium, in particular air, including a cooling circuit. Conventional arrangements of this type are equipped with evaporators in which the gaseous medium is guided over a pipe coil conducting a coolant and is cooled down thereby so that part of the humidity content precipitates as condensate.

Such arrangements operate with poor efficiency and require very bulky, complex designs to meet their function, and because of the integrated configuration within the cooling circuit of a cooling plant can be maintained or repaired only in a very difficult manner.

SUMMARY OF THE INVENTION

It is thus an object of the invention to create an arrangement of the above-stated type that operates at a high efficiency and has relatively smaller overall dimensions. A further object of the invention is the possibility of a simple dismantling of the arrangement and its separation from the remaining plant during maintenance works or repair.

These objects are attained in accordance with the invention by connecting the arrangement to a conventional cooling plant and by providing the arrangement with an evaporator that is formed as a hollow body and includes a pipe coil for conducting a coolant, such as e.g. freon, and a series of parallel ribs, preferably perpendicularly to the pipe coil, between which the gaseous medium is conducted in form of a gas stream in a first direction, with the hollow body being enclosed by an outer housing at formation of an intermediate space through which the gas stream is conducted in a second direction opposite to the first. Such a forced reversal of the direction of the gas stream promotes the condensation of the humidity contained in the gaseous medium and increases thereby the efficiency of the drying effect of the gas.

According to a further variation, a condensate separator may be arranged in the area of the intermediate space between the hollow body and the housing, and formed preferably by a ring-shaped assembly of e.g. corrosion-resistant steel fibers. Such a condensate separator retains the liquid droplets, e.g. water droplets, that precipitate in the gas stream, and absorbs a fraction of the humidity content from the gas flowing therethrough.

According to a further feature of the invention, a first condensate drain trap which is connected to the condensate separator may be arranged at the housing. Such a condensate drain trap collects the liquid separated from the condensate separator for conduction to a drain to thereby prevent a disadvantageous return flow of the precipitated liquid droplets in opposite direction back to the medium stream.

According to a further feature of the invention, a tubular opening with flanged connection is mounted to the housing for conducting the gas stream in the second direction opposite to the first. In this manner, the gas stream which already has passed through the evaporator in two directions can exit the evaporator again.

In view of a further advantageous feature of the invention, the housing is of tubular configuration, with one end being closed by a cover and the other end being configured in form of a flange which is closeable by an end piece or connectable to a heat exchanger. This realizes a simple construction which also allows attachment of components to further enhance the efficiency and enables a problem-free maintenance of the evaporator.

In accordance with a further variation, a gas/gas heat exchanger is provided which includes a tank surrounding a pipe assembly with ribs and having one end provided with a connection flange for attachment to the evaporator and another end exhibiting an air inlet port. An exchanger connected to the evaporator in this manner precools the gas stream to be dried and reheats the gas stream exiting the evaporator so that the evaporator has to cope only with a smaller temperature differential, and the gas flow which is of reduced humidity content exits the arrangement after being cooled down in a reheated stage again.

According to a further advantageous feature of the invention, the pipes of the pipe assembly may be arranged in parallel relationship and parallel to the longitudinal direction of the tank, with the pipe assembly being provided on both its ends with end plates for closure relative to the tank, whereby a gas stream is conducted within the pipes in a first direction and a gas flow is conducted outside the pipes in a second direction opposite to the first. In this manner, the cooled gas flow from the evaporator precools the gas entering the separator.

According to a further feature of the invention, the pipe assembly with ribs is spaced at a distance from the walls of the tank, and baffles may be arranged for forcing a gas flow along a snake-like path in parallel relationship to the ribs. This results in a correspondingly long flow path for the gas stream exiting the evaporator for transmitting coldness upon the gas flow conducted within the pipes of the pipe assembly in opposite direction for cooling thereof.

A preferred embodiment of the invention includes the provision of the tank with a gas outlet port.

According to a further variation, a filter may be arranged in the area of the gas inlet port for removing foreign matter, which is present in the gas stream entering the exchanger, from this gas stream.

Finally, according to an embodiment of the invention, a second condensate drain trap is provided in the area of the connection flange to the evaporator. Such a drain trap collects the liquid, which downstream of the exchanger condenses from the gas stream due to the cooling down effect, and guides the condensed liquid to a drain. The humidity contained in the gaseous medium is composed in most cases of water vapor; however, any other liquid vapor is to be considered within the scope of the invention.

BRIEF DESCRIPTION OF THE DRAWING

The invention will now be described in more detail with reference to the attached drawings, in which.

DETAILED DESCRIPTION OF PREFERRED EMBODIMENTS

Figure 1:
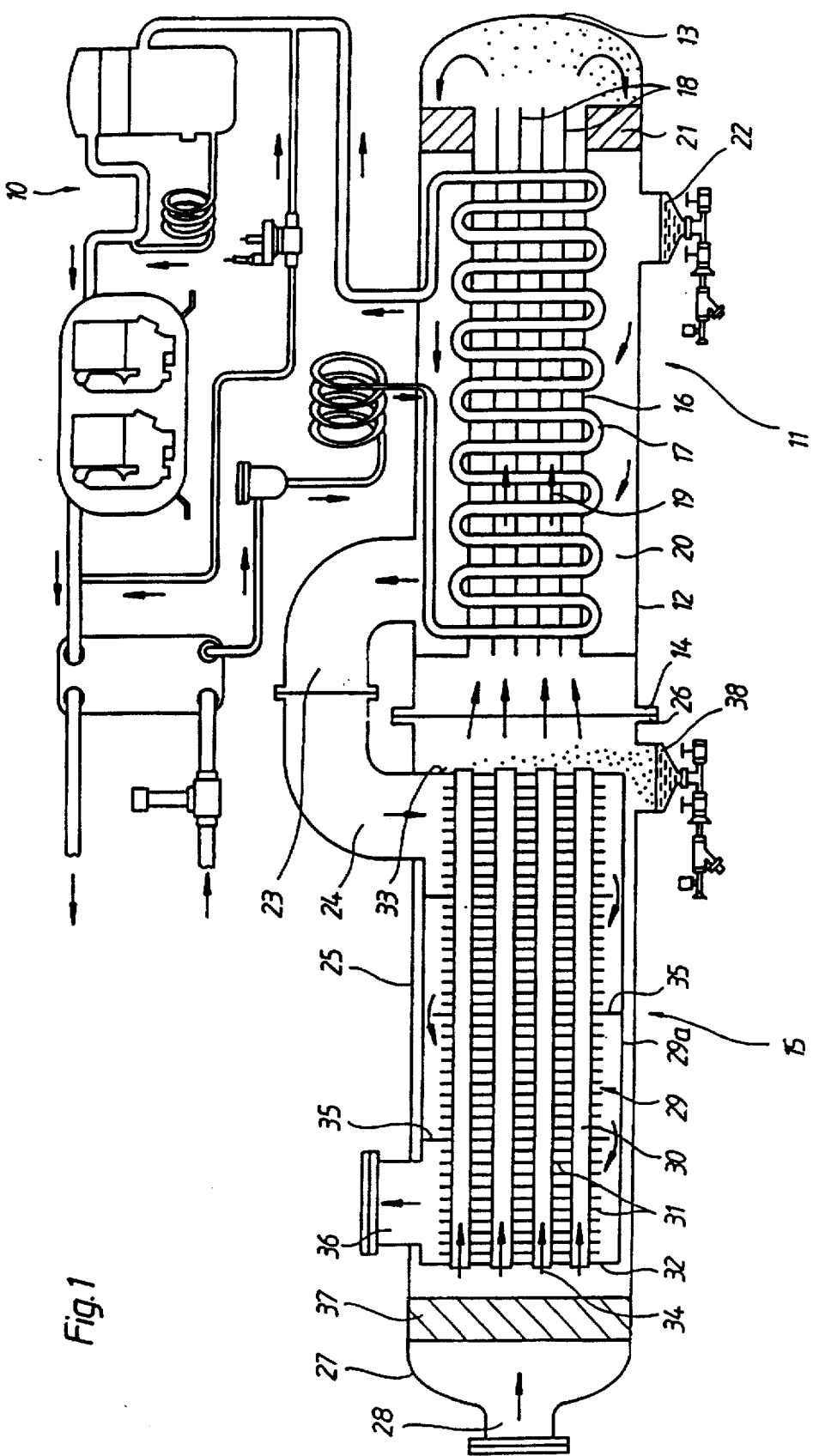
FIG. 1 shows a schematic illustration of one embodiment of an arrangement according to the invention.

FIG. 1 illustrates an arrangement according to the invention with a cooling circuit, with the arrangement including an evaporator 11 connected to a conventional cooling plant 10 and mounted to a subsequent gas/gas heat exchanger 15. In this exemplified embodiment, the gaseous medium is formed by an air stream which contains a high humidity content of water vapor before entering the arrangement according to the invention. The invention should not be limited in this way, however, as any gaseous medium with a humidity content of random vapors may be subjected to a drying action. The evaporator 11 is enclosed by an outer tubular metal housing 12 which is closed off on one end by a cover 13 and is connected on its other end by a flange 14 to the heat exchanger 15. The evaporator 11 in turn is formed by an elongated hollow body 16 which supports along its length a pipe coil 17 of copper for conducting coolant, in this case freon, from the cooling system 10. The hollow body 16 includes a series of parallel longitudinal ribs 18 of aluminum which extend transversely to the pipe coil 17 and between which an air stream exiting the separator is guided in direction of the arrow 19. The hollow body 16, which is mounted by a not shown system of screws and bar linkage to the tubular metal housing 12, can be withdrawn therefrom for maintenance purposes and repair works. Furthermore, guides are provided to optimize the positioning of the hollow body 16. After passing between the longitudinal ribs 18, the air stream is reversed in its direction by the inside of the cover 13 and conducted in the intermediate space 20 formed between the housing 12 and the hollow body 16 in the direction opposite to the direction 19 along the hollow body 16. The interior of the housing 12 accommodates in the area of the cover 13 a condensate separator 21 which is formed by a ring-shaped assembly of corrosion-resistant steel fibers and retains the condensed water droplets formed during cooling down after passage of the ribs 18 and directional reversal of the air stream. A first condensate drain trap 22 mounted to the housing 12 collects the water which is retained by the separator 21 and can then be discharged via a valve. Arranged at the cover 13 distant end of the housing 12 in the area of the flange 14 is a tubular opening 23 with flange for allowing the air stream that flows through the intermediate space 20 to exit and which is connected to a complementary opening 24 with flange for attachment to the exchanger 15. The heat exchanger 15 is enclosed by a tank 25 which is formed on one end with a connection flange 26 for attachment to the complementary flange 14 and on the other end with an inlet cover 27 which includes an air inlet port 28 for air inlet. The exchanger 15 itself is formed by a pipe assembly 29 which is housed in a box-shaped body 29a. The assembly 29 is composed of aluminum pipes 30 with inner three-layered ribs which are arranged in parallel relationship and parallel to the longitudinal direction of the tank 25, and of a series of ribs 31 of copper which extend transversely to the longitudinal direction and intersect the aluminum pipes 30. The ends of the pipe assembly 29 is provided with plates 32 and 33 which close off both end areas of the tank 25 with respect to its interposed inner part. An air stream is conducted inside the pipes 30 in direction of the arrows 34 while an air stream exiting the evaporator 11 via the openings 23 and 24 is conducted outside in opposite direction thereto. In order to allow passage of an air stream outside the pipes 30, the pipe assembly 29 is arranged at a distance from the wall surface of the tank 25. Furthermore, baffles 35 are provided by which the air stream is forced on a snake-like path in parallel relationship to the ribs 31. The tank 25 is further formed with an air outlet port 36 through which the air stream is guide to the outside after passage of the sections as defined by the baffles 35. Mounted in the area of the inlet cover 27 for the air inlet is a filter 37 which retains contaminations that are potentially present in the entering air stream, while a second condensate drain trap 38 is provided in the area ahead of the connection flange 26 for the water droplets precipitating from the air stream. The air/air heat exchanger 15 exploits the air stream, that exits the evaporator 11 and is already cooled down, for precooling the air stream entering via the port 28 so that the efficiency is significantly increased in comparison to conventional arrangements of this type. Subsequently, the further cooling down of the air stream up to the dew point is effected within the interior of the evaporator 11 through the evaporation of the freon within the pipe coil 17. At the same time, the air exiting the evaporator 11 is heated up again during passage through the exchanger 15 upon the outside of the pipe assembly 29. By means of the exchanger 15, the air thus reaches the evaporator 11 at a considerably lower temperature so that the cooling circuit 10 can operate at lower cooling capacity. All components provided within the arrangements are lined with a corrosion-protecting epoxy coating which is resistant with regard to precipitating condensate water.

Figure 2:
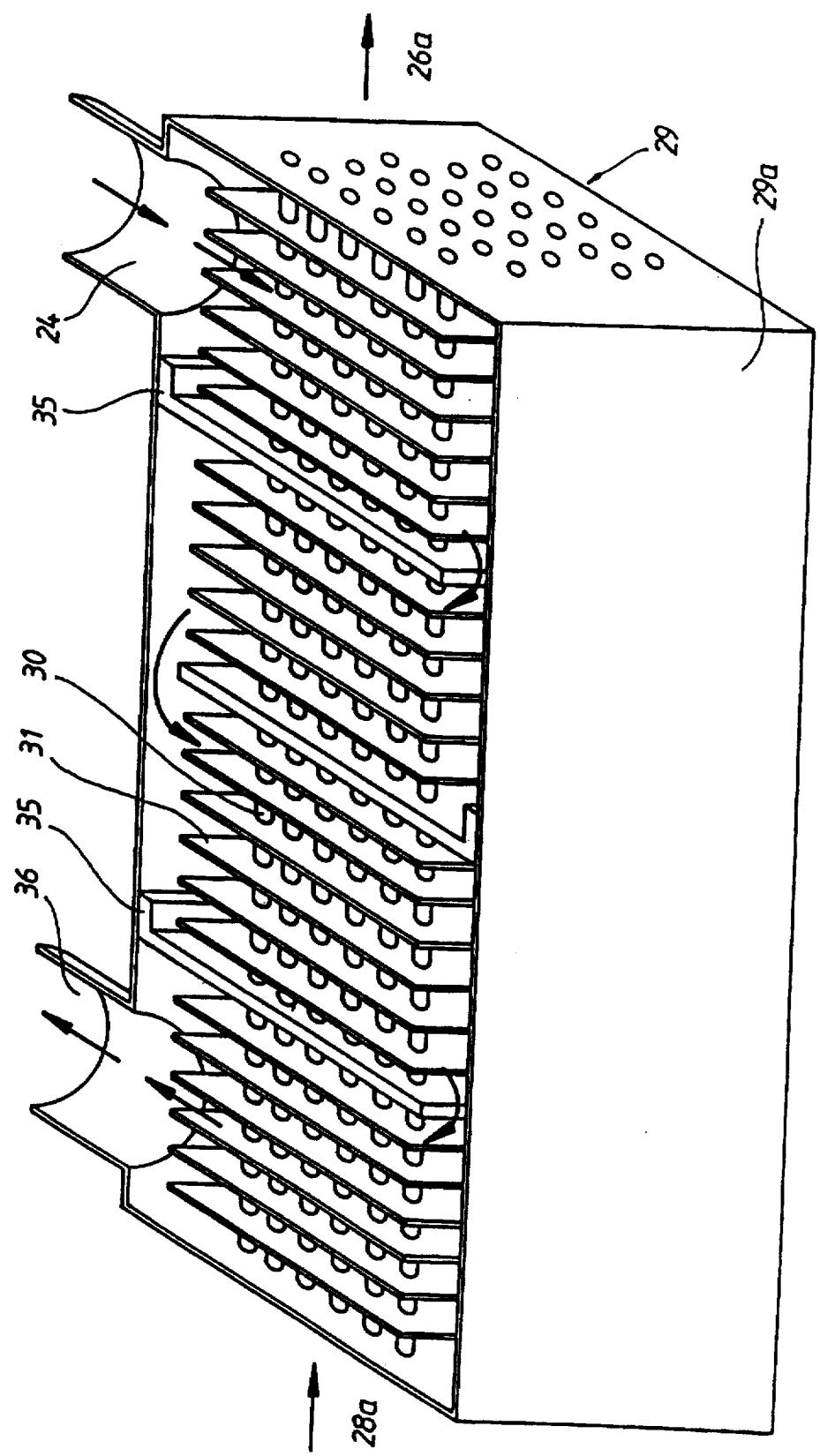
FIG. 2 shows a detailed illustration of an embodiment of a gas/gas heat exchanger.

FIG. 2 shows an air/air heat exchanger in accordance with the invention, including a box-shaped body 29a and the enclosed pipe assembly 29 with the transverse ribs 31. The pipes 30 of aluminum extend parallel to each other in longitudinal direction of the body 29a and perpendicular to the ribs 31. The air stream that enters the exchanger 15 via the not shown port 28 at 28a and is routed through the interior of the pipes, exits the exchanger again in the area of the not shown flange 26 at 26a and is fed to the evaporator 11. An air stream flowing in opposite direction and already led through the evaporator flows through the opening 24 into the part of the body 29a that is closed by the end plates 32, 33 with regard to the inlet area and the outlet area of the pipes 30 and is routed in form of a serpentine always parallel to a part of the ribs 31, with this path being forced by respectively arranged baffles 35. Along this path, the already dried air stream from the evaporator 11 transmits its coldness over the ribs upon the air stream guided within the pipes 30 to effect a precooling of the air stream.

We claim:

1. An arrangement for reducing the humidity content of a gaseous medium comprising:

a coolant source;

an evaporator including a housing having an inlet port for an incoming gas medium and having sidewalls for defining an interior, a hollow body received within the interior of the housing at formation of an intermediate space between the housing and the hollow body, said hollow body including a pipe coil connected to the coolant source for conducting a coolant therethrough, and a plurality of parallel longitudinal ribs extending perpendicular to the pipe coil and forming sidewalls of the hollow body, with the gaseous medium being conducted in form of a gas stream in a first direction between the longitudinal ribs towards an outlet of the hollow body; and deflection means attached to the hollow body at the outlet thereof for reversing the gas stream and conduction in a second direction opposite to the first direction through the intermediate space.

2. The arrangement of claim 1, and further comprising a condensate separator so positioned between the hollow body and the housing that the gas stream after being reversed by the deflection means passes through the condensate separator into the intermediate space.

3. The arrangement of claim 1 wherein the deflection means is formed by a cap-shaped end piece which is mounted to the housing.

4. The arrangement of claim 2 wherein the condensate separator is formed by a ring-shaped assembly of fibers.

5. The arrangement of claim 4 wherein the fibers are corrosion-resistant steel fibers.

6. The arrangement of claim 2 wherein the evaporator includes a first condensate drain trap formed at the housing and connected to the condensate separator.

7. The arrangement of claim 1 wherein the housing is formed with an opening, and further comprising a pipe having one end secured to the opening and another end in the form of a flanged connection, said pipe conducting the gas stream in the second direction opposite to the first direction.

8. The arrangement of claim 1, and further comprising a gas/gas heat exchanger positioned upstream of the evaporator for precooling the gas medium before entering the evaporator, said housing being of tubular configuration, with one end being closed by a cap-shaped cover and another end being configured in form of a flange for attachment to the gas/gas heat exchanger.

9. The arrangement of claim 1 wherein the housing is of tubular configuration, with one end being closed by a cap-shaped cover and another end being configured in form of a flange for attachment to a closing end piece.

10. The arrangement of claim 1, and further comprising a gas/gas heat exchanger positioned upstream of the evaporator for precooling the gas medium before entering the evaporator, said gas/gas heat exchanger including a tank defining a longitudinal axis, and a pipe assembly with ribs surrounded by the tank, said tank having one end provided with a connection flange for attachment to the evaporator and another end exhibiting the inlet port.

11. The arrangement of claim 10 wherein the pipe assembly has pipes in parallel relationship to each other and parallel to the longitudinal axis of the tank, said pipe assembly having opposing ends closed by end plates wherein a gas stream is conducted within the pipes in a first direction and a gas stream is conducted outside the pipes in a second direction in opposition to the first direction.

12. The arrangement of claim 10 wherein the tank has an inside wall, said pipe assembly being spaced at a distance from the inside wall, said gas/gas heat exchanger further including baffles so arranged within the tank as to force the gas stream along a snake-like path in parallel relationship to the ribs.

13. The arrangement of claim 12 wherein the tank is formed with an outlet port for discharge of the gas stream after negotiating the snake-like path.

14. The arrangement of claim 10 wherein the gas/gas heat exchanger includes a filter arranged in the area of the inlet port.

15. The arrangement of claim 10 wherein the gas/gas heat exchanger, includes a second condensate drain trap positioned in proximity to the evaporator in an area near the connection flange.

\* \* \* \* \*